US009289347B2

(12) United States Patent
Powell et al.

(10) Patent No.: US 9,289,347 B2
(45) Date of Patent: Mar. 22, 2016

(54) ERECT POSTURE MOBILITY DEVICE WITH LOW TURN RADIUS

(71) Applicants: Richard Randal Powell, Las Cruces, NM (US); Johnna Dawn Powell, N. Easton, MA (US)

(72) Inventors: Richard Randal Powell, Las Cruces, NM (US); Johnna Dawn Powell, N. Easton, MA (US)

( * ) Notice: Subject to any disclaimer, the term of this patent is extended or adjusted under 35 U.S.C. 154(b) by 0 days.

(21) Appl. No.: 14/173,998

(22) Filed: Feb. 6, 2014

(65) Prior Publication Data

US 2015/0216757 A1    Aug. 6, 2015

(51) Int. Cl.
  *B62B 9/12*  (2006.01)
  *A61H 3/04*  (2006.01)
  *B62B 5/00*  (2006.01)
  *B62B 9/00*  (2006.01)
  *A61H 3/00*  (2006.01)

(52) U.S. Cl.
  CPC .. *A61H 3/04* (2013.01); *B62B 5/00* (2013.01); *B62B 9/00* (2013.01); *A61H 2003/006* (2013.01); *A61H 2003/046* (2013.01)

(58) Field of Classification Search
  CPC ................................................. A61H 2003/006
  USPC .............. 280/87.021, 87.041; 482/66, 67, 68; 135/66, 67
  See application file for complete search history.

(56) References Cited

U.S. PATENT DOCUMENTS

| | | | | |
|---|---|---|---|---|
| 4,510,956 A | * | 4/1985 | King | 482/68 |
| 4,813,664 A | * | 3/1989 | Vroulis | 482/68 |
| 4,985,947 A | * | 1/1991 | Ethridge | 5/86.1 |
| 5,020,560 A | * | 6/1991 | Turbeville | 135/67 |
| 5,224,717 A | * | 7/1993 | Lowen | 280/1.5 |
| 5,378,215 A | * | 1/1995 | Harkins | 482/67 |
| 5,676,388 A | * | 10/1997 | Bertani | 280/87.041 |
| 5,702,326 A | * | 12/1997 | Renteria | 482/68 |
| 5,839,740 A | * | 11/1998 | Seeger | 280/87.021 |
| 6,003,532 A | * | 12/1999 | Pi | 135/67 |
| 6,343,802 B1 | * | 2/2002 | Workman et al. | 280/87.041 |
| 6,688,633 B2 | * | 2/2004 | van't Schip | 280/642 |

(Continued)

FOREIGN PATENT DOCUMENTS

| | | |
|---|---|---|
| EP | 1020173 A2 | 7/2000 |
| EP | 2086493 B1 | 6/2010 |

OTHER PUBLICATIONS

Cole et al., The effects of upper body weight support upon cardiovascular, metabolic and electromyographic variables during assisted walking, International Journal of Rehabilitation Research 23, 129-134 (2000).

*Primary Examiner* — Jeffrey J Restifo
(74) *Attorney, Agent, or Firm* — Law Office of Ilya Libenzon (57) ABSTRACT

The present invention is a mobility device, (also referred to as a "rollator"), which provides a weight bearing architecture and enables the user to maintain an erect body posture and body weight support through the upper arms while enabling the legs to freely move under the user's center of body weight. Upper arm support is enabled through padded forearm rests, or "arm saddles", which provide an elevated cushion rearward to support and position the user's elbows and transfer the center of the body weight vertically downward and through the rollator frame and thereby falling within its base of support as defined by its four support wheels. The invention's base of support is smaller than conventional rollators, thereby enabling responsive rotational movement by transferring the user's spinal rotation through the aforementioned arm saddles to the rollator frame resulting in a low-radius turn.

39 Claims, 9 Drawing Sheets

(56) References Cited

U.S. PATENT DOCUMENTS

| | | | |
|---|---|---|---|
| 6,743,156 B1* | 6/2004 | Jacques et al. | 482/68 |
| 7,052,030 B2* | 5/2006 | Serhan | 280/304.1 |
| 7,111,856 B1* | 9/2006 | Graham | 280/87.021 |
| 7,311,319 B1* | 12/2007 | Ortega | 280/87.05 |
| 7,494,138 B2* | 2/2009 | Graham | 280/87.021 |
| 7,547,027 B2* | 6/2009 | Bohn | 280/87.021 |
| 7,866,677 B1* | 1/2011 | Rothstein et al. | 280/47.34 |
| 7,938,413 B2* | 5/2011 | Anderson | 280/87.021 |
| 8,215,652 B2* | 7/2012 | Dashew et al. | 280/87.05 |
| 8,348,288 B1* | 1/2013 | Laughon, Sr. | 280/87.021 |
| 8,468,622 B2* | 6/2013 | Purwar et al. | 5/86.1 |
| 8,540,256 B1* | 9/2013 | Simpson | 280/87.05 |
| 8,596,658 B1* | 12/2013 | Dashew et al. | 280/87.021 |
| 8,827,284 B2* | 9/2014 | Walther et al. | 280/87.041 |
| 8,857,832 B2* | 10/2014 | Smith | 280/87.05 |
| 2004/0201192 A1* | 10/2004 | Ramm | 280/87.021 |
| 2005/0156395 A1* | 7/2005 | Bohn | 280/87.021 |
| 2008/0079230 A1* | 4/2008 | Graham | 280/87.041 |

* cited by examiner

Side View

Top View

ERECT POSTURE MOBILITY DEVICE WITH LOW TURN RADIUS

TECHNICAL FIELD

The invention relates to a mobility device and related methods. More specifically, the invention relates to an assisted mobility device for maintaining stable and erect body posture of a user and providing low-radius rotational mobility while a user is engaged in motion.

BACKGROUND OF THE INVENTION

A wide variety of mobility devices (hereinafter also referred to as "rollators") exist to assist in bipedal movement. Most of these devices rely upon upper body support being maintained through an extended arm position with hands gripping support bars, which are part of the rollator structure. Several rollator inventions have claimed improvement over conventional rollators by incorporating arm rests rather than grip bars for assistive body support (e.g., as described in US 2005/0156395A1, EP 1020173A2, EP 2086493B1, U.S. Pat. Nos. 7,547,027B2 and 7,111,856B1, each of which is herein incorporated by reference).

While arm support platforms have been claimed to assist in maintaining a more erect locomotor posture, the under girding architectures of conventional rollators do not provide for a normal and stable distribution of the user's center of body weight within his base of support or centrally within the rollator's structural base of support. Furthermore, deviations from the horizontal arm platform position (saggital plane: tilting up or down) or deviations from a linear position (horizontal plane: turning platform inward or outward) have not been designed for the purpose of intentionally changing the position of the user's center of gravity relative to that of the rollator's base of support. Moreover, deviations in the horizontal platform position have not been a subject of design in accommodating user needs related to stability, walking speed, and body ponderosity.

It has been demonstrated that when comparing forearm support vs. hand support for assisted weight bearing, the forearm support position was found to be more physiologically economical, and required less shoulder and upper arm muscular stress across three representative weight bearing demands (e.g., as described in "The effects of upper body weight support upon cardiovascular, metabolic, and electromyographic variables during assisted walking," *International Journal of Rehabilitation Research*, 23, 129-134, 2000, herein incorporated by reference).

The population of people who require the use of an assistive walking device is ever increasing. There is a need for mobility devices, e.g. walkers with arm supports, to better help with maintaining stable and erect body posture of a user and with providing low-radius rotational mobility while a user is engaged in motion. Current mobility devices lack these features and therefore, there is a need for well-built, highly functional mobility devices that can maintain optimal body posture and provide low-radius rotational mobility.

DEFINITIONS

By "mobility device" is meant a device that can be used to maintain stable and erect body posture of a user and provide low-radius rotational mobility while a user is engaged in motion (e.g., walking motion).

By "low-radius rotational mobility" or "low turn radius" is meant that a user can turn with minimal radial movement, e.g., with a radius of turn in a range of 10 to 15 inches.

By "user's center of gravity" is meant that the center of body weight in a human body from which an imaginary vertical line can be drawn which is perpendicular to the ground and can identify the central point of weight distribution borne by the individual's limb support.

By "area of the base of support of the device" is meant an area defined by a polygon made by connecting the points of ground-contact of the wheels of the device. The polygon would define the area of the base of support, within which a user would walk. By "rear 50% to 70% of the area of the base of support of the device" is meant the rear part of this polygon that is proximal to the imaginary line connecting the ground-contact points of the two rear wheels.

By "slits" is meant short (2-3 cm.) longitudinal cuts (or openings) with a width of 2-3 mm. at the ends of structural tubing.

By "braking mechanism" is meant a system of operably connected cable, cable stop bracket, and one or more levers that can be used to stop a device in motion.

SUMMARY OF THE INVENTION

The present invention describes a mobility device designed to maintain stable and erect body posture of a user and provide low-radius rotational mobility while a user is engaged in motion (e.g., walking motion), where the device includes: a frame comprising two upright supports; one or more members connecting the two upright supports; two rear wheel struts whose lengths are adjustable; one or more front wheels and two rear wheels; and two arm saddle structures functionally attached to the two upright supports, such that the saddle structures are designed to place the forearm of the user in a position parallel to the ground and such that the user's center of gravity falls within an area of a base of support of the device that is defined by the contact points of the wheels with the floor, thereby maintaining stable and erect body posture and providing low-radius rotational mobility while the user is engaged in motion. The mobility device can be a device selected from the group consisting of an assistive walking device, a child stroller, and a shopping cart.

The saddle structures of the mobility device can transmit any rotational motion of the user through the saddle structure to the entire device. Furthermore, the user's center of gravity falls within the rear 50% to 70% of the area of the base of support of the device. The turn radius of the mobility device can be 10-15 inches, e.g., 12 inches.

In one aspect of the device, one or more members can connect the upright supports. These can be horizontal members that can be parallel to each other. Alternatively, one or more of the members connecting the upright supports can be at an angle relative to each other and intersect. The members connecting the upright supports can include for example, a horizontal structural bottom member and a horizontal structural upper member that connect the two vertical supports at two locations along the vertical axis of the device. Furthermore, the members connecting the upright supports can be curved or straight in shape.

The upright supports of the device can be angulated 10° to 25° relative to the ground and the rear wheel struts can extend rearward from the upright supports at a length of 15 to 20 inches to enable the ground points of contact of the front and rear wheels on the same side, when attached to the device, to be 10 to 20 inches apart.

The device can have one or more (e.g., two) front wheels, each of which can be mounted on a swivel structure. The device can be configured such that the rear wheels do not swivel. The wheels of the device can be made of a material selected from the group consisting of hard rubber, pneumatic tires, and cushion supported wheel treads. In one aspect of the invention, the length of the rear wheel struts can be adjusted based on stature of the user to change the base of support of the device.

The rear wheel struts can be made of round metal tubing, square metal tubing, or structural plastic, with mounting holes on each end of the struts, such that a received bolt on a proximal end of the strut and a received bolt on a distal end of the strut can remain in the same planar alignment. The struts supporting the rear wheels can fold to a position parallel to the upright supports. Furthermore, the struts can be mounted with a braking mechanism operably connected to a brake lever, which activates a cable whose tension activates a brake in the form of a lever applied to the periphery of a rear wheel, or compresses brake pads, which are applied to a disk attached to each wheel.

The width between the front wheels (e.g., the distance between the two front wheels) can be 15 to 25 inches and width between the rear wheels can be 20 to 30 inches, such that two imaginary diagonal lines extending from the ground points of contact of the right front wheel and left rear wheel, and left front wheel and right rear wheel intersect at a point that is a center of stability of the device.

Any of the frame, the upright supports, the members connecting the upright supports, the rear wheel struts, and the saddle structures can be made from any combination of one or more materials selected from the group consisting of tubular steel, aluminum, and injection molded plastic.

The device of the invention can include a U-shaped bracket attached to each of the upright supports, which have two free ends with holes to receive a bolt to enable articulation with the rear wheel struts.

The saddle structure of the device can include one or more of a combination of a forearm seat, a saddle plane positioning disk, a grip handle, a grip handle stem, and a saddle post. The forearm seat can be adjustable to shift the user's center of gravity relative to the base of support. The forearm seat, saddle plane positioning disk, grip handle, grip handle stem, and saddle post can be made from one or more materials selected from the group consisting of tubular steel, aluminum, and injection molded plastic.

The saddle structure of the device can further include a saddle post that includes a telescoping component for adjusting the height of the saddle structure. The saddle posts can have an outside diameter that is smaller than the inside diameter of the upper end of the upright supports, such that the saddle posts can slide freely within the upright supports for adjustment of the height of the saddle post. The upright supports of the device can further include slits and can be fit with one or more compression clamps for affixing the saddle posts at a specific position along the length of the upright supports, when the compression clamps are tightened. Holes can be present in the upright supports and the saddle posts, such that a pin inserted through holes of the upright supports and the saddle posts can be used for affixing the saddle post at a specific position along the length of the upright supports.

The saddle structure of the device can also include: a platform frame made of two parallel frame pieces of 90° angled metal strips, which are pre-drilled at intervals both on the tops and the sides, such that the top holes on the frame pieces align with threaded inserts on the underside receiving plate of the forearm seat and allow for threaded bolts to secure the forearm seat in one or more positions to accommodate differing forearm lengths of users; a saddle plane positioning disk with top holes that align with the side holes on the frame pieces; saddle posts with top holes that align with pre-drilled holes of angled grip handle stem and with top holes of the saddle plane positioning disk and the side holes on the frame pieces, such that securing bolts that pass through aligned holes can secure the saddle post, the saddle plane positioning disk, and the grip handle stem between the upright sides of each pair of the platform frame strips for each saddle structure.

The holes on the saddle positioning disk and the holes on the saddle post enable affixing saddle structure position such that the position can be secured in place by a threaded knob which passes through one of the saddle positioning disk holes and through the saddle post hole with a threaded receiving bolt aligned with the hole and welded to the saddle post. The saddle structure position can be affixed with a metal spring button embedded in the hole of the saddle post, such that the metal spring button projects and clicks into one the selected saddle positioning disk holes. The saddle structure position can be an angular position or a straight position.

The device can also include a seat attached to the upright supports. Furthermore, the curved horizontal structural upper member can form a structure for resting back of the user when the user is seated.

The present invention also includes a saddle structure for attachment to any mobility device of a user's choice (e.g., a mobility device selected from the group consisting of an assistive walking device, a child stroller, and a shopping cart), with three or more wheels. The saddle structure can provide body weight support through the upper arms of a user. Such a saddle structure includes: a forearm seat designed to place the forearm of the user in a position parallel to the ground; a saddle plane positioning disk; a grip handle; a grip handle stem; and a saddle post. The forearm seat, saddle plane positioning disk, grip handle, grip handle stem, and saddle post can be made from one or more materials selected from the group consisting of tubular steel, aluminum, and injection molded plastic.

The invention also includes a method of maintaining stable and erect body posture of a user and providing low-radius rotational mobility while a user is engaged in motion (e.g., walking motion), where the method includes the use of a mobility device (e.g., a mobility device selected from the group consisting of an assistive walking device, a child stroller, and a shopping cart) that includes: a frame comprising two upright supports; one or more members connecting the two upright supports; two rear wheel struts whose lengths are adjustable; one or more front wheels and two rear wheels; and two arm saddle structures functionally attached to the two upright supports. The saddle structures can be designed to place the forearm of said user in a position parallel to the ground such that the user's center of gravity falls within an area of a base of support of said device that is defined by the contact points of said wheels with the floor.

The method includes the placement of forearm of the user on the arm saddle structures such that the forearm is parallel to the ground and the user's center of gravity falls within an area of a base of support of the device that is defined by the contact points of the wheels with the floor, thereby maintaining stable and erect body posture and providing low-radius (e.g., 10 to 15 inches) rotational mobility while the user is engaged in motion. Preferable low-radius rotational mobility has a radius of 12 inches. The arm saddle structure further includes a forearm seat, a saddle plane-positioning disk, a grip handle, a grip handle stem, and a saddle post. The position of the forearm seat can be adjustable to shift the user's center of gravity relative to the base of support.

The mobility device to be used in the method of the invention can be one that has features as described above in the device of the invention. In one aspect of the method of the invention, the length of the rear wheel struts can be adjusted based on stature of the user to change the base of support of the device.

DETAILED DESCRIPTION OF THE INVENTION

The present invention describes a mobility device designed to maintain stable and erect body posture of a user and provide low-radius rotational mobility while a user is engaged in motion. The device has a smaller area of base of support, as compared to most conventional rollators.

In general the device includes the following components: a frame comprising two upright supports; one or more members connecting the two upright supports; two rear wheel struts whose lengths are adjustable; one or more front wheels and two rear wheels; and two arm saddle structures functionally attached to the two upright supports, such that the saddle structures are designed to place the forearm of the user in a position parallel to the ground and such that the user's center of gravity falls within an area of a base of support of the device, thereby maintaining stable and erect body posture and providing low-radius rotational mobility while the user is engaged in motion.

In general, the user's center of gravity falls within the rear 50% to 70%, preferably 50%, of the area of the base of support of the device. For example, in the case that the device has four wheels, one can imagine a four-sided polygon formed by the points of ground-contact of the four wheels. The polygon would define the area of the base of support, within which a user would walk. The rear 50% to 70% of this area would be the part of the rectangle that is proximal to the imaginary line connecting the ground-contact points of the two rear wheels.

Body weight support is conveyed through the arm saddle structures by positioning the user's elbows to direct body weight variably downward through the device's frame, enabling the user to specifically and reliably integrate body position and weight transfer through the machine's base of support. The saddle structures transmit any rotational motion of the user through the saddle structure to the entire device, thus providing for a low turn-radius of about 10 to 15 inches (e.g., 10, 11, 12, 13, 14, or 15 inches). Rotation of the user's head and upper torso transmits through the arm saddles and in turn rotates the rollator in a very compact space with minimal effort.

Very slow and rehabilitative walking, requiring a highly stable base of support, can be facilitated with a forward tilt of the arm saddles, while faster walking can be facilitated with a more backward tilt of the arm saddles which shifts center of weight bearing farther back in the rollator base of support and in front of the body's base of support (feet) as would normally occur during faster walking or even jogging.

The device can also have a foldable seat. In one aspect of the device, when the arm saddles are turned 180°, and completely lowered, then a user may sit while using the arm saddles for comfort and braking control. Seated movement is enabled by pushing or pulling with the legs and is an option when the invention is so configured.

The mobility device can be a device selected from the group consisting of, but not limited to, an assistive walking device, a child stroller, and a shopping cart.

In general, this invention is specifically designed to facilitate erect walking posture while also enabling responsive rotational movement within a small space. It is also designed to enable a wide range of locomotor speeds and rehabilitative applications by enabling adjustment of the user's center of body weight relative to the rollator base of support through the integration of its arm saddle positioning. Finally, this invention can be configured to allow seated mobility through leg pushing or pulling movements.

Figure 1:
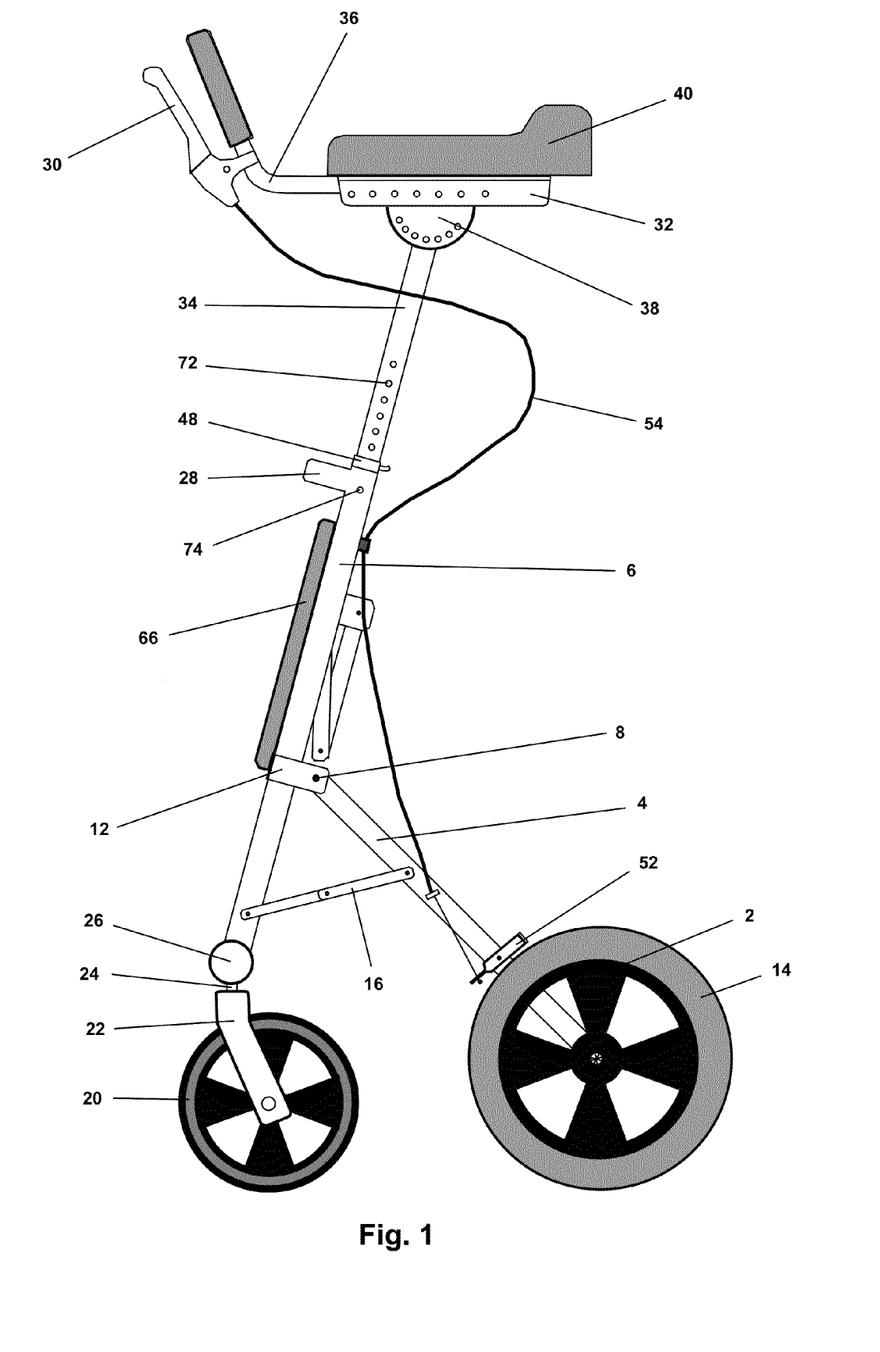
FIG. 1 is a side view of the present invention with seat up.
Figure 2:
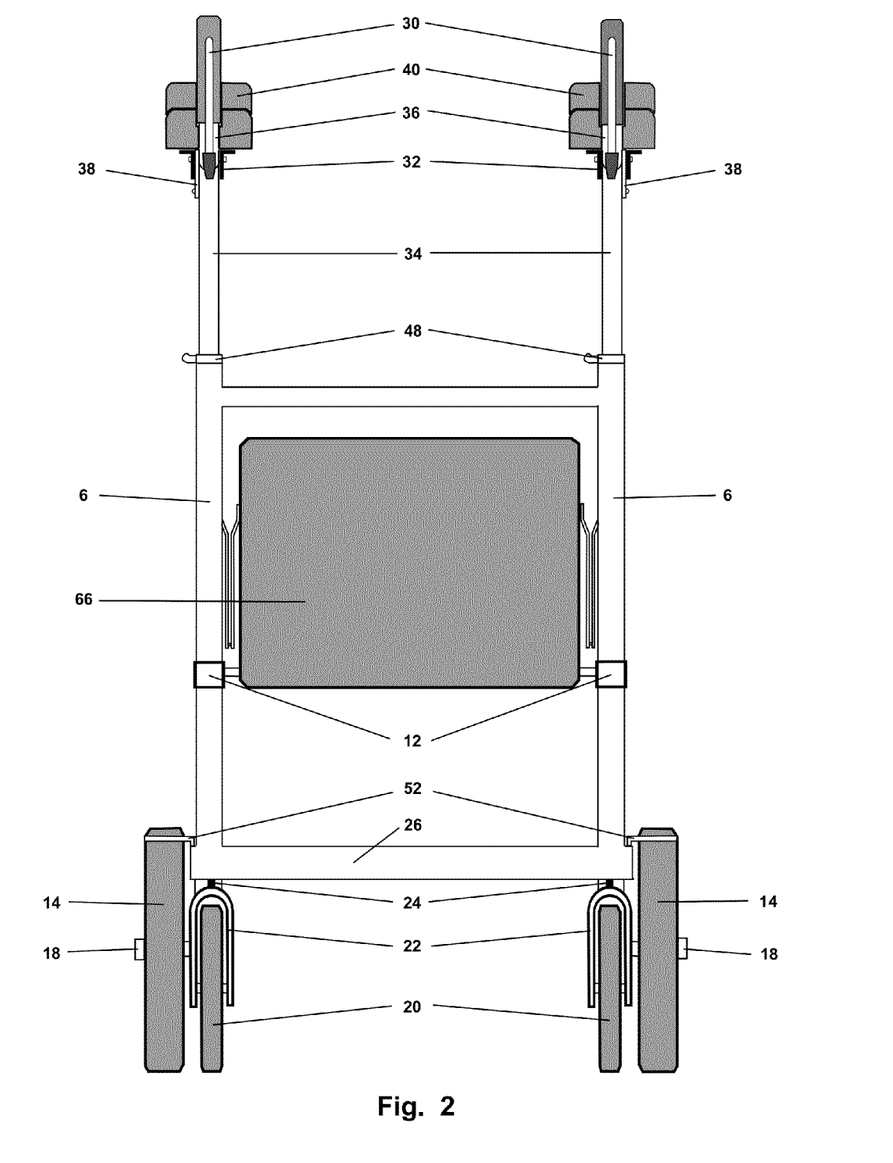
FIG. 2 is a front view of the present invention with seat up.

Referring to the invention in more detail, FIG. 1 illustrates a side view and FIG. 2 illustrates a front view of an exemplary mobility device. FIG. 1 and FIG. 2 illustrate the following main components:

1. a frame defined by two upright (e.g., vertical) supports 6, one or more members connecting the upright supports, e.g., a horizontal structural bottom member 26 and a horizontal structural upper member 28, which can be curved;
2. two rear wheel struts 4;
3. two front soft rubber wheels 20 each mounted on a swivel structure 22, and two fixed rear wheels 2 with pneumatic tires 14;
4. and two saddle structures, each including a cushioned elbow/forearm seat 40, a platform frame 32, a saddle plane positioning disk 38, an angled grip handle stem 36, a hand brake mechanism 30, and a saddle post 34 which acts as a telescoping component for the entire structure.

When these main components are configured as illustrated in the exemplary device shown in FIG. 1 and FIG. 2, the architecture of the invention has a small four-point base of support defined by its four wheels.

Figure 3:
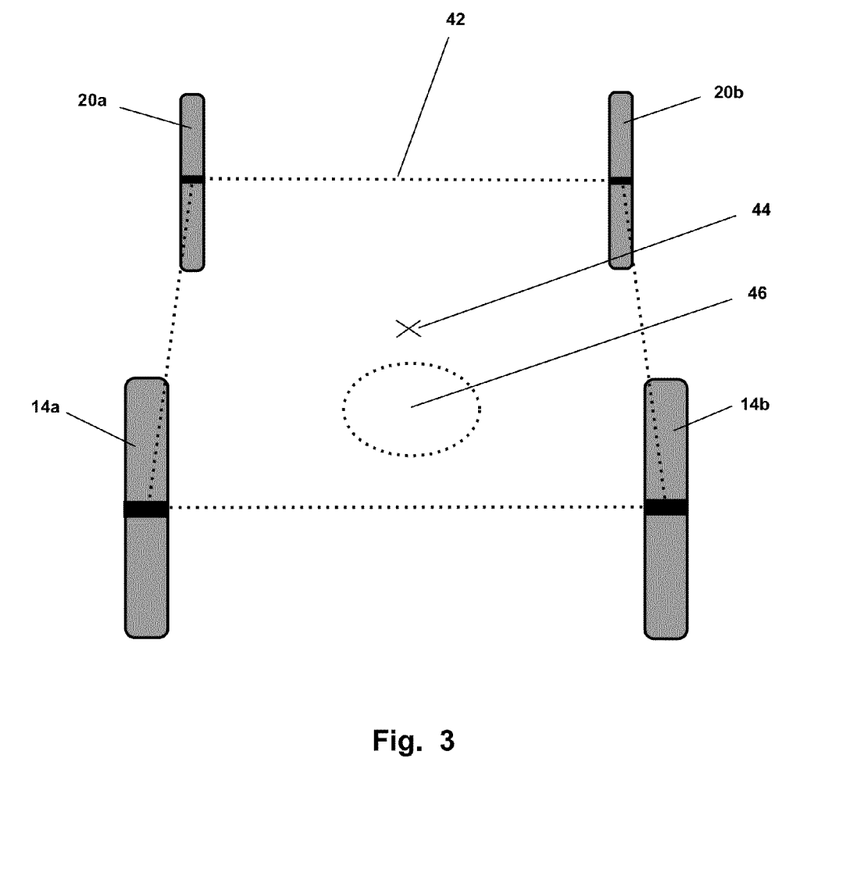
FIG. 3 is a diagram of the present invention's base of support showing a user's center of gravity.

The outline of the base of support 42 of the rollator is illustrated in FIG. 3 with its center of stability 44 representing the intersection of two diagonal lines extending from the points of contact of the right front wheel 20b and left rear tire 14a, and the left front wheel 20a and right rear tire 14b.

Figure 4:
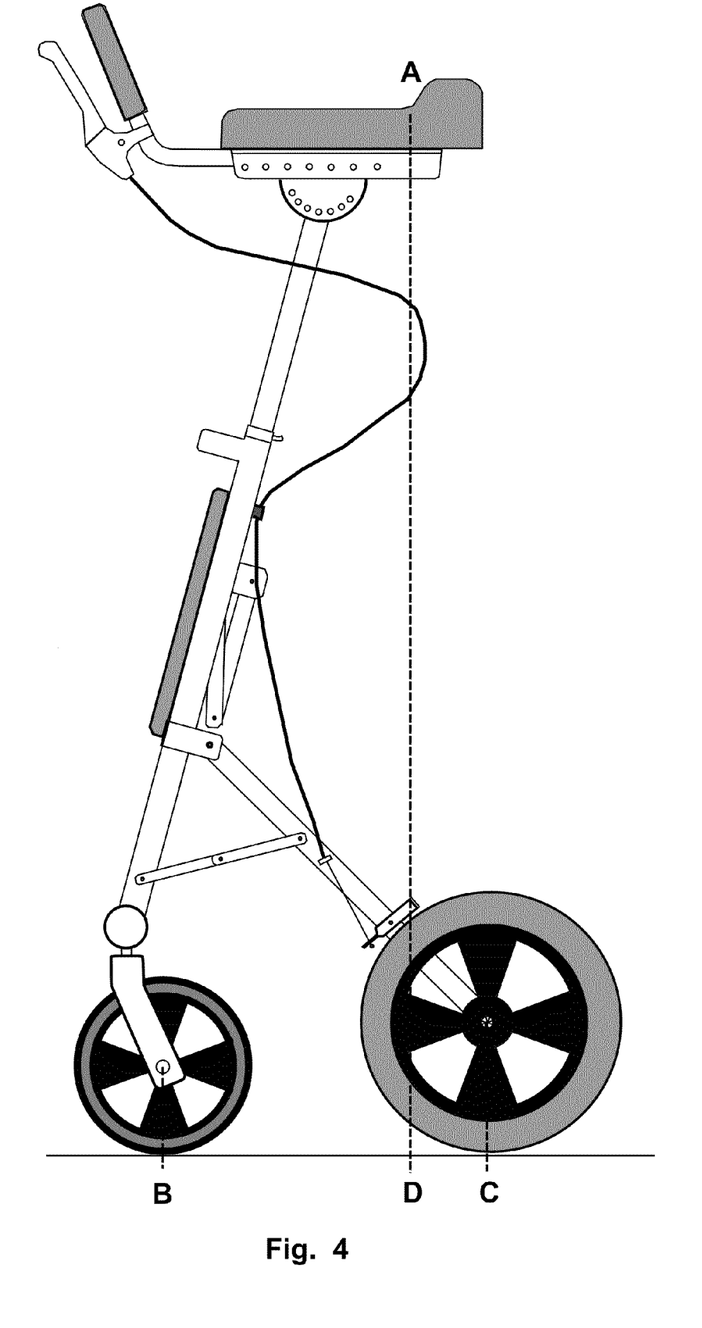
FIG. 4 is a diagram illustrating the present invention's support architecture and distribution of user's weight.
Figure 5:
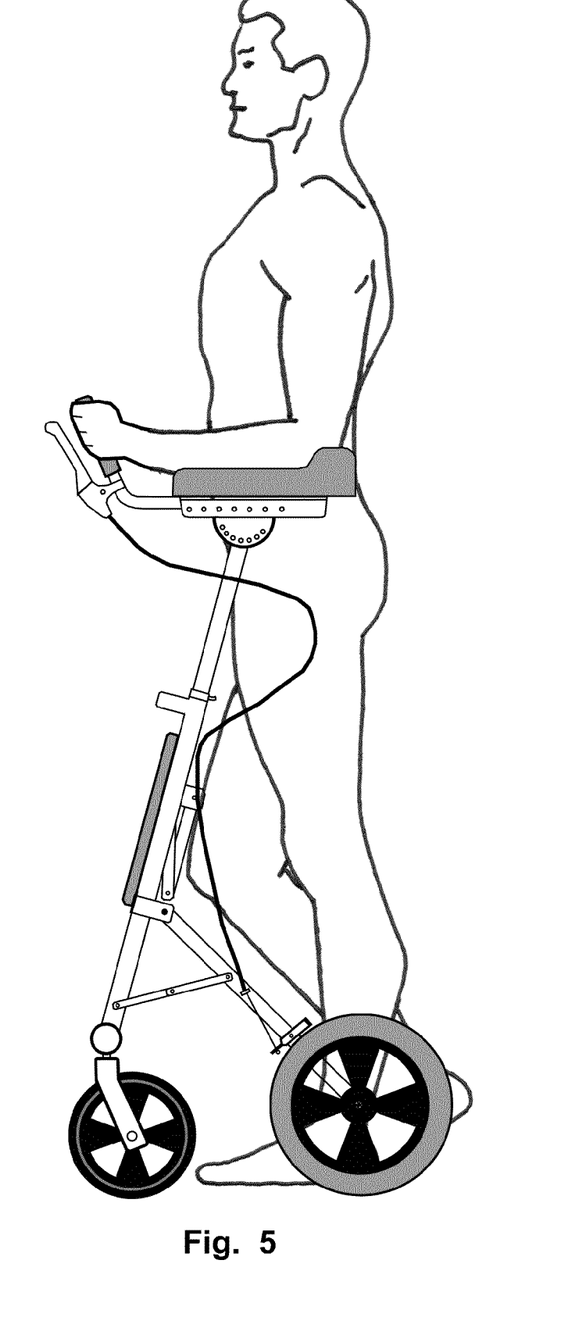
FIG. 5 is a side view of the present invention showing a user in position.

The architecture of the mobility device is intended to direct the center of body weight 46 of the user to fall within its base of support 42 during slow walking, but behind its center of stability 44, preferably within the rear 50% to 70% of the area of the base of support. The directional geometry of the user's center of body weight 46 is illustrated in FIG. 4 where point A represents the vertical point of weight bearing where the user's upper arms are maintained in a vertical position and support for the upper body weight, as illustrated in FIG. 5, is borne through the elbow, which is positioned in the cushioned elbow/forearm seat 40, enabling body weight to be vertically directed downward through each arm saddle when the arm saddle is horizontally positioned.

Referring to FIG. 4 again, the directional upper body weight distribution AD is between the point of contact B of the front wheel 20 and the point of contact C of the rear tire 14 on the same side of the rollator. The dissection point D between points B and C illustrates the rearward shift of the user's center of body weight 46 relative to the rollator's center of stability 44, and is designed to be disproportionately weighted on the larger rear wheels 2 compared to the smaller front wheels 20 such that the percent distribution of weight on the rear wheels can be represented as:

$$[(B-D)/(B-C)] \times 100.$$

During typical slow walking, the device architecture is designed to bear approximately 75% of the user's weight on the rear wheels 2, and thus optimize maneuverability while maintaining device stability and support. Adjustments for optimal stability for users having different statures or mobility capabilities can be effected through changing the length of the rear wheel struts 4 which in turn can change the rollator base of support 42 and/or change the angulation of the frame vertical supports 6.

Additional adjustments can be effected through the position of the cushioned elbow/forearm seat 40 to shift the directional weight bearing forward or backward relative to the rollator base of support. In addition to the general architectural design of the rollator invention in accommodating the user's weight distribution within its base of support, its weight bearing architecture is also designed to help the user to maintain an erect posture and enable the user to turn or rotate his body seamlessly with the rollator serving as an extension of self.

The maintenance of an erect body postural "frame" is facilitated through the design of the cushioned elbow/forearm seat 40, which provides a concave cushion for forearm position together with a cushioned "cup" for the elbow, which contours around the rear elbow and provides vertical support for the upper arm. This configuration restricts the user from opening up the elbow joint significantly beyond a 90° angle, and when the arm saddle structure's elevation is positioned properly as illustrated in FIG. 5, it encourages the user to maintain his weight distribution within the rollator base of support as illustrated in FIG. 4.

The aforementioned postural "frame" is akin to that of a dancer in that body rotation to effect turning relies on a sequential motoric phenomenon related to cephalocaudal movement. Natural rotation is initiated with the head or upper torso ("cephalo") and is transmitted sequentially through the musculo-skeletal connectivity of the spine downward through the sacrum, or tailbone ("caudal"), including the attached pelvic girdle and legs. When the center of body weight 46 is appropriately positioned relative to the rollator's center of stability 44, then the architecture of the rollator invention enables an alignment of the user's anatomical frame to the rollator in that as his head rotates right or left, his shoulder frame will rotate in kind and transmit such rotation through the cushioned elbow/forearm seat 40 and henceforth through the arm saddle structure which transmits rotation through the entire rollator as if it were an extension of the user's body. The result of this compatibility of rollator architecture to human anatomy is a high level of maneuverability with maintenance of a desirable erect posture.

Each of the main components of the invention and their subcomponents are discussed below: the frame, the rear wheel struts, the wheels, and the arm saddle structure.

Frame

The frame includes two upright supports and one or more members connecting the two upright supports. The one or more members connecting the upright supports can be horizontal members that can be parallel to each other. Alternatively, one or more of the members connecting the upright supports can be at an angle relative to each other and intersect. The members connecting the upright supports can include for example, a horizontal structural bottom member and a horizontal structural upper member that connect the two vertical supports at two locations along the vertical axis of the device. Furthermore, the members connecting the upright supports can be curved or straight.

The frame structure's upright supports 6 can be angulated approximately 10° to 25° (e.g., 10°, 12°, 15°, 18°, 20°, 22°, or 25°) from vertical, preferably 15° from vertical, and the rear wheel struts 4 extend rearward from the frame's vertical supports 6 with a length of approximately 15 to 20 inches (e.g., 15, 16, 17, 18, 19, or 20 inches), preferably 18 inches, to enable the ground point of contact between the attached rear wheel 2 and the front wheel 20 on the same side to be approximately 10 to 20 inches (e.g., 10, 11, 12, 13, 14, 15, 16, 17, 18, 19, or 20 inches), preferably 15 inches, apart.

The overall frame structure, and each of its components, can be made from any combination of one or more materials selected from the group consisting of tubular steel, aluminum, and injection molded plastic. Referring to FIG. 1 and FIG. 2, additional subcomponents of the frame structure include a U shaped bracket 12, that can be attached to each vertical support 6 and each having its two free ends with holes to receive a bolt 8 to enable articulation with the rear wheel struts 4.

The frame for a folding seat 66 can use the same axis points 8 as is used for the rear wheel struts 4. The seat in a folded down position is illustrated in FIG. 9.

The horizontal structural bottom member 26 can be fitted with an attached threaded nut on each end of its underside to receive a threaded bolt 24 attached to the swivel structure 22 on which the front wheels 20 are mounted.

Figure 9:
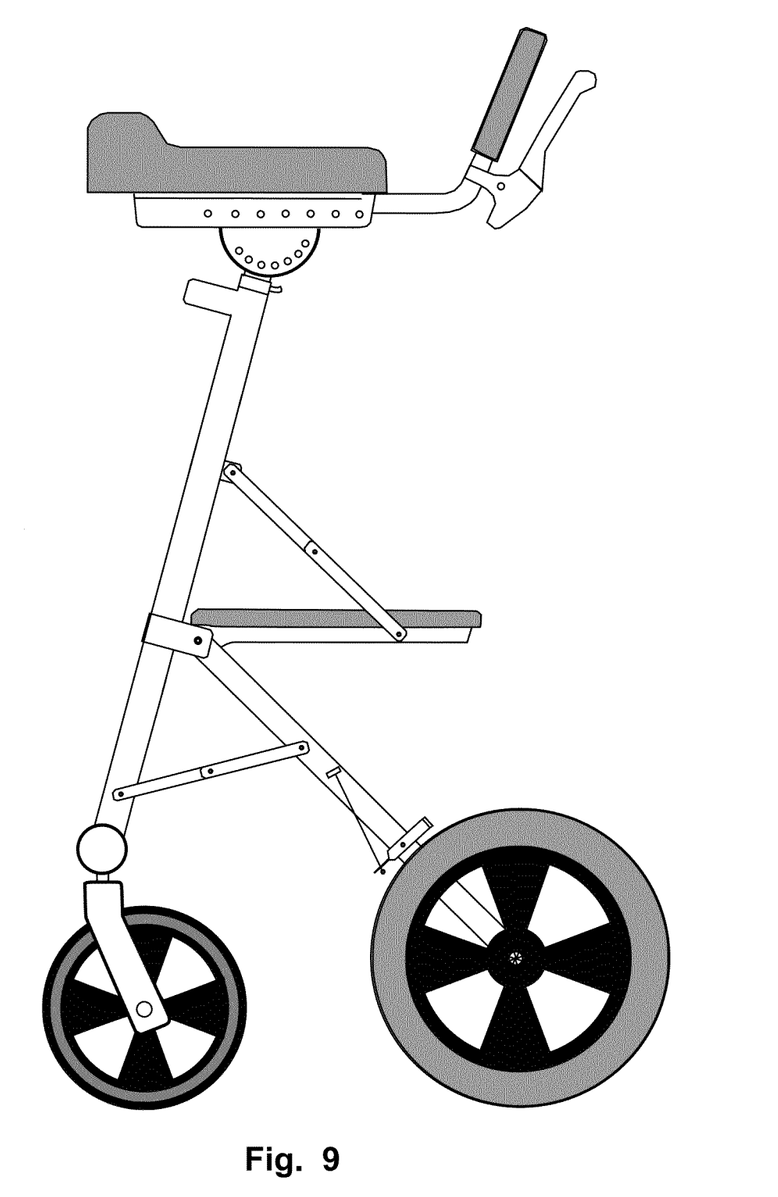
FIG. 9 is a side view of the present invention showing the seat down position and arm saddles rotated and lowered.

A curved structural upper member 28 can be configured to allow additional space for the user and also to provide for a back-rest when the seat is lowered and in use, as shown in FIG. 9. Additionally, the curvature of the cross member enables an attachment point for a basket (e.g., a shopping basket) or baggage container in front of the rollator.

The upper ends of each vertical support 6 can be fitted to position and secure the saddle posts 34. Two methods of securing post positioning can be accomplished by either using either a compression clamp apparatus or a pinning apparatus.

Using a compression clamp apparatus, the upper ends of the vertical supports 6 can be slitted and fitted with compression clamps 48 and having an internal diameter sufficient to not only allow the saddle post 34 to slide freely, but also to be affixed in one position when the compression clamps 48 are tightened.

Figure 6:
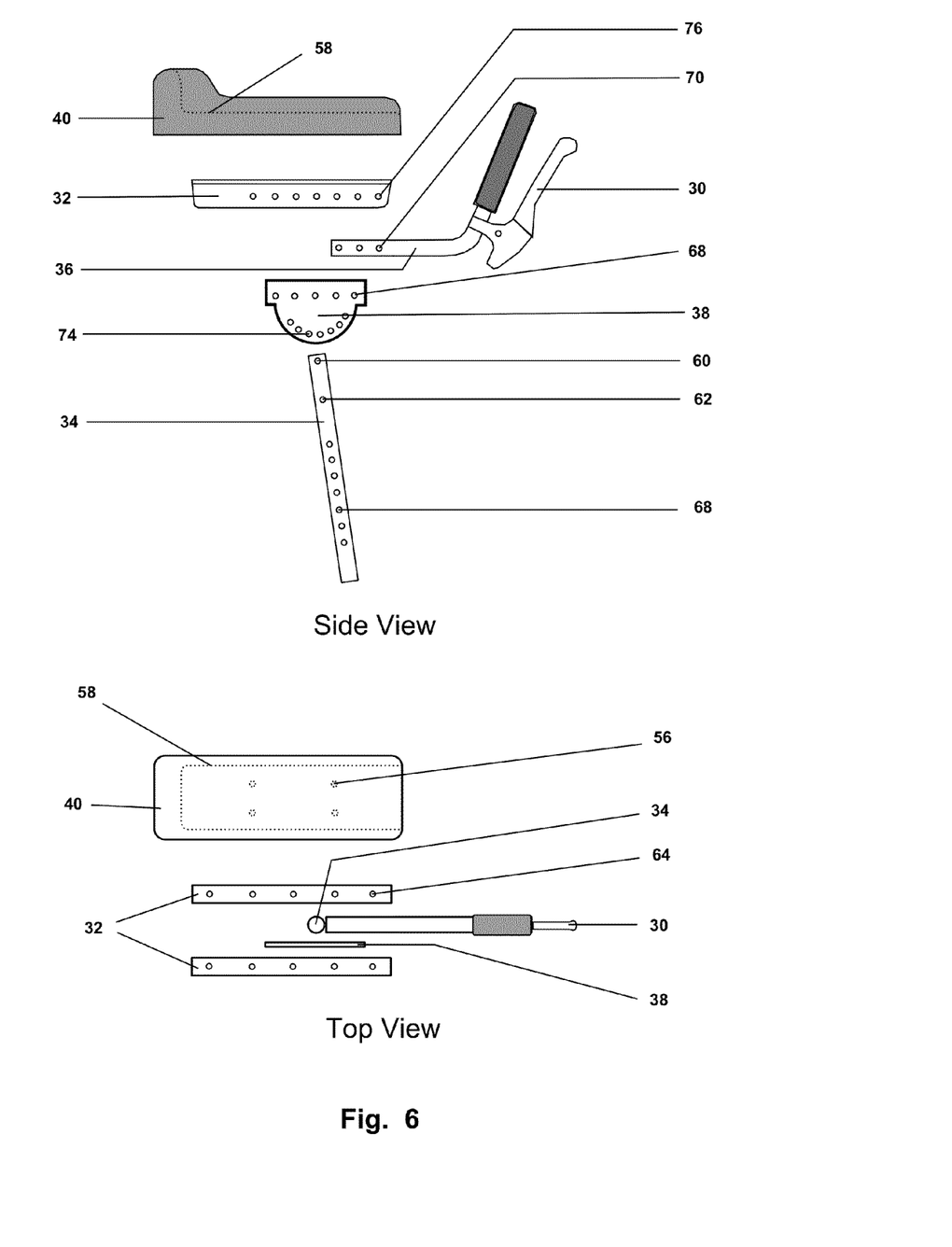
FIG. 6 is a side and top view of the arm saddle subcomponents.

Alternatively, when using a pinning apparatus, the upper ends of the vertical supports 6 can be drilled with holes 74 through which a pin will slide. Referring to FIG. 6, saddle posts 34 can be similarly drilled with holes 72 at approximately one inch intervals to enable positioning the posts at variable heights based on the location of pin insertion.

Rear Wheel Struts

Again referring to FIG. 1, the rear wheel struts 4 can be made of round metal tubing, square metal tubing, or structural plastic, with mounting holes on each end of the struts, such that a received bolt 8 on the proximal end and the received bolt 18 on the distal end remain in the same planar alignment. Bolt 8 secures the proximal end of the strut 4 by passing through one side of the free end of the U shaped bracket 12, through the proximal hole of the strut 4, and through the remaining free end of the bracket 12 and secured by a lock nut. The hole on the distal end of each strut 4 receives the bolt 18 for mounting each rear wheel 2.

Alterations to the aforementioned planar alignment of bolt 8 and bolt 18 can be made to enable a camber to each rear wheel 2 for additional stability. Additionally, struts can be bent to increase the distance between the rear wheels 2 so as to accommodate larger users or enable special applications requiring more foot space.

Each rear wheel strut 4 can fold so that it is approximately parallel to each vertical support 6 with its rear wheel 2 and its tire 14 able to clear the two front wheels 20. When the rear wheel struts 4 are extended, they are held in a fixed support position by the extension of a foldable hinged-bar 16 whose one end is attached to the lower end of each vertical support 6 and whose other end is attached midway on each strut 4. Additionally, each strut 4 can be mounted with a braking mechanism (e.g., a braking lever) 52 connected to a brake lever 30 which activates a cable 54 whose tension is adjusted through a cable stop bracket 50 welded to the strut 4. Alternatively, a disk brake application can be substituted.

Wheels

The device can have one or more (e.g., two) front wheels each of which can be mounted on a swivel structure. The device can be configured such that the rear wheels do not swivel. The tires of the device can be made of a material selected from the group consisting of soft rubber, hard rubber, pneumatic tires, and cushion supported wheel treads, all of which can be applied to a plastic wheel mount.

As shown in the exemplary device in the figures, the width between the front wheels 20 can be 15 to 25 inches (e.g., 15, 16, 17, 18, 19, 20, 21, 22, 23, 24, or 25 inches), and the width between the rear wheels 2 can be 20 to 30 inches (e.g., 20, 22, 24, 26, 28, or 30 inches). In one embodiment, the width between the front wheels and the width between the rear wheels can be can be 20 inches and 23.5 inches respectively.

As shown in the exemplary figures, the front wheel 20 can be approximately 4 to 12 inches in diameter (e.g., 4, 5, 6, 7, 8, 9, 10, 11, or 12 inches), preferably 8 inches in diameter, and made of soft rubber mounted on a plastic wheel mount. Each front wheel can be mounted on a swivel structure 22 acquired from a variety of commercially available designs. Each rear wheel 2 is mounted with a pneumatic tire 14 with the overall diameter of approximately 8 to 16 inches (e.g., 8, 9, 10, 11, 12, 13, 14, 15, or 16 inches), preferably 12 inches. Each rear wheel 2 is mounted with an aforementioned bolt 18 with a small spacer between the wheel 2 and the distal end of the strut 4 to enable clearance of the rear wheels relative to the front wheels 20 when in a folded position.

Saddle Structure

The saddle structure of the device can include one or more of a combination of a forearm seat, a saddle plane positioning disk, a grip handle, a grip handle stem, and a saddle post. The forearm seat can be adjustable to shift the user's center of gravity relative to the base of support. The forearm seat, saddle plane positioning disk, grip handle, grip handle stem, and saddle post can be made from one or more materials selected from the group consisting of tubular steel, aluminum, and injection molded plastic.

The saddle structure of the device can further include a saddle post that includes a telescoping component for adjusting the height of the saddle structure. The saddle posts can have an outside diameter smaller than the inside diameter of the upper end of the upright supports. This enables the saddle posts to slide freely within the upright supports for adjustment of the height of the saddle post. The upright supports of the device can further include slits on the upper ends (e.g., narrow cuts or openings with a width of 2 to 3 mm) and can be fit with one or more compression clamps for affixing the saddle posts at a specific position along the length of the upright supports when the compression clamps are tightened. Alternatively, holes can be present in the upright supports and the saddle posts, such that a pin inserted through holes of the upright supports and the saddle posts can be used for affixing the saddle post at a specific position along the length of the upright supports.

FIG. 6 shows additional subcomponents of an exemplary saddle structure. The platform frame 32 is made of two parallel pieces of 90° angled metal strips, which are pre-drilled at intervals both on the tops and the sides. Top holes on the frame pieces 64 align with threaded inserts 56 on the underside receiving plate of the cushioned elbow/forearm seat 40, and allow for threaded bolts to secure the forearm seat 40 in three alternative positions to accommodate differing forearm lengths of users. Side holes 76 on the frame pieces 64 align with top holes 68 of the saddle plane positioning disk 38, the top holes 60 of each saddle post 34, and the pre-drilled holes 70 of each angled grip handle stem 36, such that securing bolts will pass through aligned holes and compress the post 34, the disk 38, and the grip handle stem 36 between the vertical sides of each pair of platform frame strips 32 for each saddle structure.

Figure 7:
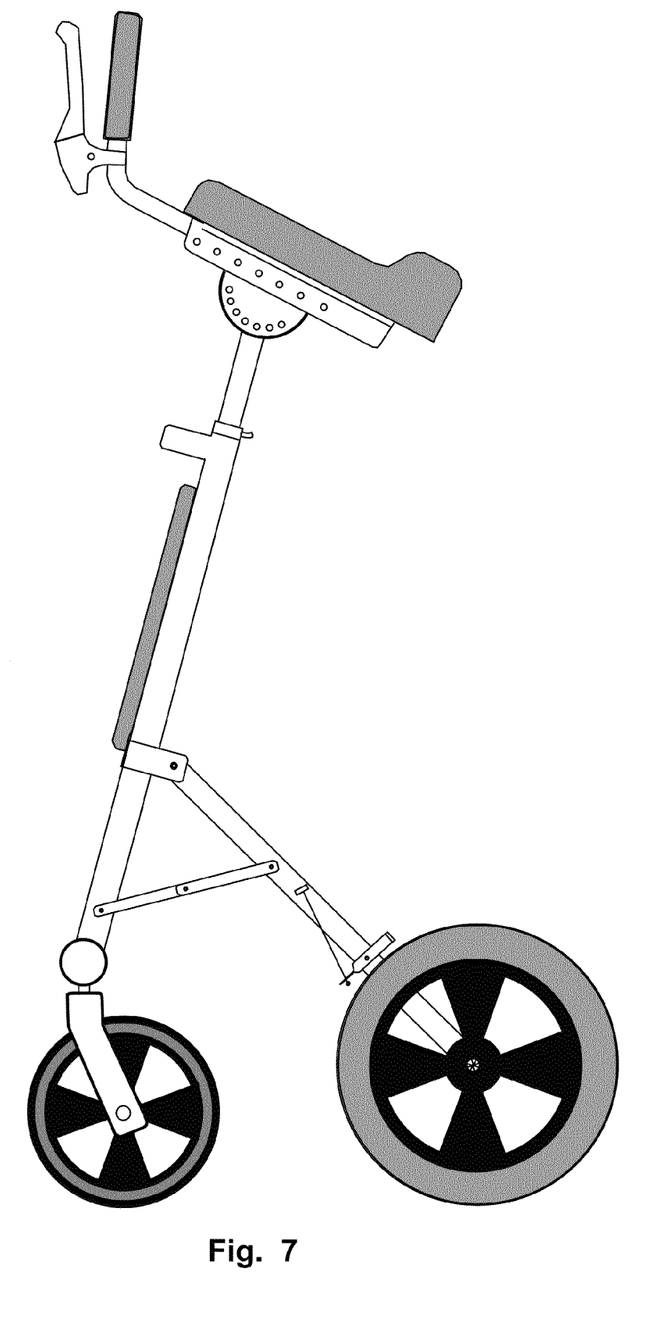
FIG. 7 is a side view of the present invention showing the arm saddles in a tilt back position.
Figure 8:
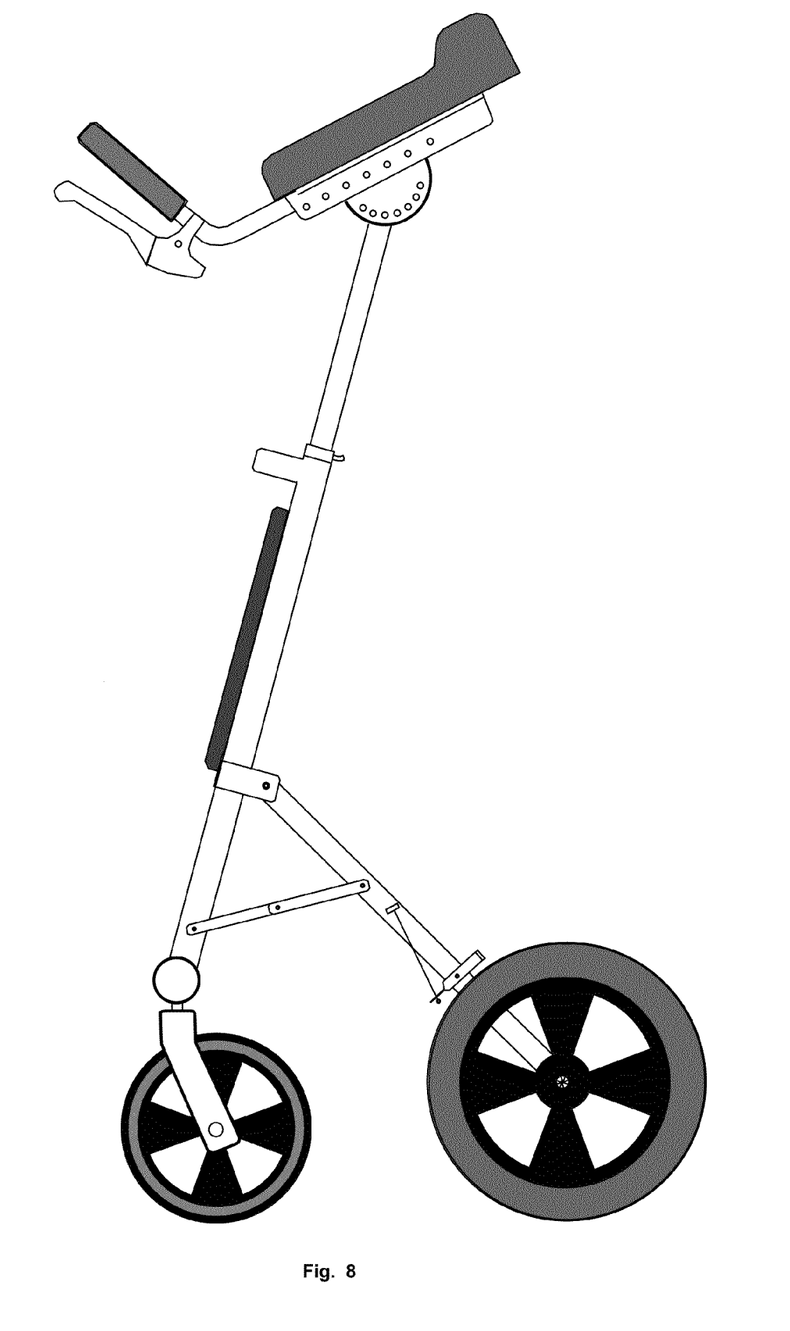
FIG. 8 is a side view of the present invention showing the arm saddles in a tilt down position.

By enabling changes in the horizontal arm platform position in the saddle structure, a shift forward or backward of the user's center of body weight relative to the invention's base of support is effected. The top hole 60 of each saddle post 34 is used as a pivot point for the angle between the post 34 and the remainder of the saddle structure components. Variable alignment between the holes 74 on the disk 38 and the hole 62 on the post 34 enable positioning the saddle structure at a variety of different angles from a tilt up position (as shown in FIG. 7) to a tilt down position (as shown in FIG. 8), and can be secured in place with a threaded knob which passes through one of the disk holes 74 and through the post hole 62 with a threaded receiving bolt aligned with the hole and welded to the interior of the post. Alternatively, saddle structure positioning can be accomplished with a metal spring button embedded in the post hole 62 which projects and clicks into one of the selected disk holes 74.

By enabling changes in the linear position of the saddle structure (straight alignment or inward rotation), an accommodation for the user's girth and/or arm comfort can be effected. Inward rotation of the saddle structures through their posts 34 can widen the user's elbow width and adjust for larger girthed people. Aforementioned adjustment applications apply to these rotational adjustments.

Each saddle structure can additionally be rotated 180° and maximally lowered into the receiving vertical supports 6. When so configured in the seat down position, as shown in FIG. 9, the user can use the saddle structure as arm rests or for braking control when using legs for seated mobility.

The design of the cushioned elbow/forearm seat 40 can be approximately 3 to 8 inches (e.g., 3, 4, 5, 6, 7, or 8 inches), preferably four inches, in width and contours to the elbow and forearm of the user with a depression in its cushion as outlined by dotted lines 58 on the interior portion of the seat 40. The height of the elbow support portion of the seat 40 can be variable depending upon rehabilitative requirements of the user. When helping to maintain an erect postural alignment facilitated through vertical positioning of the upper arms, a higher elbow support contour might be indicated.

The present invention also provides a saddle structure for attachment to any mobility device of a user's choice (e.g., a mobility device selected from the group consisting of an assistive walking device, a child stroller, and a shopping cart), with three or more wheels. This saddle structure can be used as a "modular component" that can be attached to any mobility device of a user's choice and can provide body weight support through the upper arms of a user when using any mobility device. As described above in the previous sections, this saddle structure generally includes: a forearm seat designed to place the forearm of the user in a position parallel to the ground; a saddle plane positioning disk; a grip handle; a grip handle stem; and a saddle post. The forearm seat, saddle plane positioning disk, grip handle, grip handle stem, and saddle post can be made from one or more materials selected from the group consisting of tubular steel, aluminum, and injection molded plastic.

Method for Maintaining Stable and Erect Body Posture and Providing Low-Radius Rotational Mobility The invention also includes a method of maintaining stable and erect body posture of a user and providing low-radius rotational mobility while a user is engaged in motion, where the method includes the use of a mobility device (e.g., a mobility device selected from the group consisting of an assistive walking device, a child stroller, and a shopping cart) that includes: a frame comprising two upright supports; a horizontal structural bottom member connecting the two upright supports; a curved horizontal structural upper member connecting the two upright supports; two rear wheel struts whose lengths are adjustable; one or more front wheels and two rear wheels; and two arm saddle structures functionally attached to the two upright supports, where the saddle structures are designed to place the forearm of the user in a position parallel to the ground.

The method includes the placement of forearm of the user on the arm saddle structures such that the forearm is parallel to the ground and the user's center of gravity falls within an area of a base of support of the device that is defined by the contact points of the wheels with the floor, thereby maintaining stable and erect body posture and providing low-radius (e.g., 10-15 inches) rotational mobility while the user is engaged in motion. Preferable low-radius rotational mobility has a radius of 12 inches. The method can include the use of a mobility device described above and can include any combination of features that have been described above.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A mobility device designed to maintain stable and erect body posture of a user and provide low-radius rotational mobility while a user is engaged in motion, said device comprising:
   a) a frame comprising two upright supports;
   b) one or more members connecting said two upright supports;
   c) two rear wheel struts whose lengths are adjustable;
   d) one or more front wheels and two rear wheels; and
   e) two arm saddle structures functionally attached to the two upright supports, wherein said saddle structures are designed to place the forearm of said user in a position parallel to the ground such that the user's center of gravity falls within an area of a base of support of said device that is defined by the contact points of said wheels with the floor, and wherein said saddle structures further comprises:
      i) a platform frame made of two parallel frame pieces of 90° angled metal strips, which are pre-drilled at intervals both on the tops and the sides, such that the top holes on said frame pieces align with threaded inserts on the underside receiving plate of said forearm seat and allow for threaded bolts to secure said forearm seat in one or more positions to accommodate differing forearm lengths of users;
      ii) saddle plane positioning disk with top holes that align with said side holes on said frame pieces; and
      iii) said saddle posts with top holes that align with pre-drilled holes of angled grip handle stem and with top holes of said saddle plane positioning disk and said side holes on said frame pieces, such that securing bolts that pass through aligned holes can secure said saddle post, said saddle plane positioning disk, and said grip handle stem between the upright sides of each pair of said platform frame strips for each saddle structure;

thereby maintaining stable and erect body posture and providing low-radius rotational mobility while said user is engaged in motion.

2. The device of claim 1, wherein said saddle structures transmit any rotational motion of said user through said saddle structure to said entire device.

3. The device of claim 1, wherein said user's center of gravity falls within the rear 70% of said area of said base of support of said device.

4. The device of claim 3, wherein said user's center of gravity falls within the rear 50% of the area of said base of support of said device.

5. The device of claim 1, wherein said low-radius is 10 to 15 inches.

6. The device of claim 5, wherein said low-radius is 12 inches.

7. The device of claim 1, wherein said one or more members connecting said upright supports are horizontal members that are parallel to each other.

8. The device of claim 1, wherein said one or more members connecting said upright supports are at an angle relative to each other and intersect.

9. The device of claim 1 wherein said arm saddle structure further comprises a forearm seat, a saddle plane positioning disk, a grip handle, a grip handle stem, and a saddle post.

10. The device of claim 9 wherein position of said forearm seat is adjustable to shift said user's center of gravity relative to said base of support.

11. The device of claim 9, wherein said forearm seat, saddle plane positioning disk, grip handle, grip handle stem, and saddle post are made from one or more materials selected from the group consisting of tubular steel, aluminum, and injection molded plastic.

12. The device of claim 1, wherein said length of said rear wheel struts are adjusted based on stature of said user to change the base of support of said device.

13. The device of claim 1, wherein said one or more front wheels are mounted on a swivel structure.

14. The device of claim 1, wherein said rear wheels do not swivel.

15. The device of claim 1, wherein said wheels are made of a material selected from the group consisting of hard rubber, pneumatic tires, and cushion supported wheel treads.

16. The device of claim 1, wherein said device comprises two front wheels.

17. The device of claim 16, wherein said upright supports are angulated 10° to 25° relative to the ground and said rear wheel struts extend rearward from said upright supports at a length of 15 to 20 inches to enable the ground points of contact of said front and rear wheels on the same side, when attached to said device, to be 10 to 20 inches apart.

18. The device of claim 17, wherein width between the two front wheels is 15 to 25 inches and width between said rear wheels is 20 to 30 inches, such that two imaginary diagonal lines extending from the ground points of contact of the right front wheel and left rear wheel, and left front wheel and right rear wheel intersect at a point that is a center of stability of said device, and help provide body support to maintain erect body posture.

19. The device of claim 1, wherein any one or more of said frame, said upright supports, said members connecting upright supports, said rear wheel struts, and said saddle structures are made from one or more materials selected from the group consisting of tubular steel, aluminum, and injection molded plastic.

20. The device of claim 1, further comprising a U-shaped bracket attached to each of said upright support, which have two free ends with holes to receive a bolt to enable articulation with said rear wheel struts.

21. The device of claim 1, wherein said one or more of said members connecting upright support is fitted with an attached threaded nut on each end of its underside to receive a threaded bolt attached to a swivel structure on which said front wheels are mounted.

22. The device of claim 1, wherein said saddle structure further comprises a saddle post comprising a telescoping component for adjusting the height of said saddle structure, wherein said saddle posts have an outside diameter smaller than the inside diameter of the upper end of said upright supports such that said saddle posts can slide freely within said upright supports for adjustment of the height of the saddle post.

23. The device of claim 22, wherein said upright supports further comprise slits and are fit with one or more compression clamps for affixing said saddle posts at a specific position along the length of said upright supports, when said compression clamps are tightened.

24. The device of claim 22, further comprising holes in said upright supports and said saddle posts, wherein a pin inserted through holes of said upright supports and said saddle posts is used for affixing said saddle post at a specific position along the length of said upright supports.

25. The device of claim 1, wherein said rear wheel struts are made of round metal tubing, square metal tubing, or structural plastic, with mounting holes on each end of said struts, such that a received bolt on a proximal end of said strut and a received bolt on a distal end of said strut remain in the same planar alignment.

26. The device of claim 1, wherein said struts supporting said rear wheels can fold to a position parallel to said upright supports.

27. The device of claim 1, wherein one or more of said struts is mounted with a braking mechanism operably connected to a brake lever which activates a cable whose tension is adjusted through a cable stop bracket welded to said strut.

28. The device of claim 1, wherein said holes on said saddle positioning disk and said holes on said saddle post enable affixing saddle structure position wherein said position can be secured in place by a threaded knob which passes through one of said saddle positioning disk holes and through said saddle post hole with a threaded receiving bolt aligned with said hole and welded to said saddle post.

29. The device of claim 28, wherein said saddle structure position is affixed with a metal spring button embedded in said hole of said saddle post, such that the metal spring button projects and clicks into one the selected saddle positioning disk holes.

30. The device of claim 28, wherein said saddle structure position can be an angular position or a straight position.

31. The device of claim 1, wherein said mobility device is a device selected from the group consisting of an assistive walking device, a child stroller, and a shopping cart.

32. The device of claim 1, wherein said device further comprises a seat attached to said upright supports.

33. The device of claim 1, wherein said curved horizontal structural upper member forms a structure for resting back of said user when said user is seated.

34. A saddle structure for attachment to a mobility device with three or more wheels and provide body weight support through the upper arms of a user, said saddle structure comprising:
   a. A forearm seat designed to place the forearm of said user in a position parallel to the ground;
   b. saddle plane positioning disk;
   c. a grip handle;
   d. a grip handle stem; and
   e. a saddle post;
   wherein said saddle structure further comprises:
      i) a platform frame made of two parallel frame pieces of 90° angled metal strips, which are pre-drilled at intervals both on the tops and the sides, such that the top holes on said frame pieces align with threaded inserts on the underside receiving plate of said forearm seat and allow for threaded bolts to secure said forearm seat in one or more positions to accommodate differing forearm lengths of users;
      ii) saddle plane positioning disk with top holes that align with said side holes on said frame pieces; and
      iii) said saddle posts with top holes that align with pre-drilled holes of angled grip handle stem and with top holes of said saddle plane positioning disk and said side holes on said frame pieces, such that securing bolts that pass through aligned holes can secure said saddle post, said saddle plane positioning disk, and said grip handle stem between the upright sides of each pair of said platform frame strips for each saddle structure.

35. The saddle structure of claim 34, wherein said holes on said saddle positioning disk and said holes on said saddle post enable affixing saddle structure position wherein said position can be secured in place by a threaded knob which passes through one of said saddle positioning disk holes and through said saddle post hole with a threaded receiving bolt aligned with said hole and welded to said saddle post.

36. The saddle structure of claim 35, wherein said saddle structure position is affixed with a metal spring button embedded in said hole of said saddle post, such that the metal spring button projects and clicks into one the selected saddle positioning disk holes.

37. The saddle structure of claim 35, wherein said saddle structure position can be an angular position or a straight position.

38. The saddle structure of claim 34, wherein said mobility device is selected from the group consisting of an assistive walking device, a child stroller, and a shopping cart.

39. The saddle structure of claim 34, wherein said forearm seat, saddle plane positioning disk, grip handle, grip handle stem, and saddle post are made from one or more materials selected from the group consisting of tubular steel, aluminum, and injection molded plastic.

* * * * *